US010636184B2

(12) United States Patent
Kreeger et al.

(10) Patent No.: US 10,636,184 B2
(45) Date of Patent: Apr. 28, 2020

(54) METHODS AND SYSTEMS FOR INTERACTIVE 3D SEGMENTATION

(71) Applicant: FOVIA, INC., Palo Alto, CA (US)

(72) Inventors: Kevin Kreeger, Palo Alto, CA (US); Georgiy Buyanovskiy, Palo Alto, CA (US); David Wilkins, Palo Alto, CA (US); Noah Brickman, Palo Alto, CA (US)

(73) Assignee: FOVIA, INC., Palo Alto, CA (US)

( * ) Notice: Subject to any disclaimer, the term of this patent is extended or adjusted under 35 U.S.C. 154(b) by 0 days.

(21) Appl. No.: 15/278,947

(22) Filed: Sep. 28, 2016

(65) Prior Publication Data

US 2017/0109915 A1  Apr. 20, 2017

Related U.S. Application Data

(60) Provisional application No. 62/241,660, filed on Oct. 14, 2015.

(51) Int. Cl.
*G06T 11/60* (2006.01)
*G06T 7/11* (2017.01)
*G06T 7/187* (2017.01)

(52) U.S. Cl.
CPC .............. *G06T 11/60* (2013.01); *G06T 7/11* (2017.01); *G06T 7/187* (2017.01);
(Continued)

(58) Field of Classification Search
CPC .................................. G06T 7/11; G06T 11/60
See application file for complete search history.

(56) References Cited

U.S. PATENT DOCUMENTS 5,825,941 A * 10/1998 Linford ................ G06T 11/203
382/294
6,556,199 B1   4/2003 Fang et al.
(Continued)

FOREIGN PATENT DOCUMENTS

EP       2806398 A1   11/2014
WO  2005/055148 A1   6/2005

OTHER PUBLICATIONS

Final Office Action received for U.S. Appl. No. 14/548,175, dated Aug. 1, 2016, 42 pages.
(Continued)

*Primary Examiner* — Phi Hoang
(74) *Attorney, Agent, or Firm* — Dentons US LLP (57) ABSTRACT

Methods and systems related to image segmentation are disclosed. In some examples, a computer system obtains segmentation parameters based on a selection of a region of a displayed image. The selection of the region is associated with a select signal generated by an input device. In response to obtaining the segmentation parameters, the computer system processes the image based on the segmentation parameters. The computer system further adjusts the segmentation parameters based on one or more move signals generated by the input device. The move signal is associated with moving of a representation of the input device within the image. The computer system processes the image based on the one or more adjusted segmentation parameters and displays an image of the selected region based on the processing of the image using the adjusted segmentation parameters.

24 Claims, 8 Drawing Sheets

(52) U.S. Cl.
CPC .............. *G06T 2200/24* (2013.01); *G06T 2207/10012* (2013.01); *G06T 2207/10072* (2013.01); *G06T 2207/20101* (2013.01); *G06T 2207/20104* (2013.01)

(56) References Cited

U.S. PATENT DOCUMENTS

| | | |
|---|---|---|
| 2001/0045955 A1 | 11/2001 | Oka |
| 2003/0052906 A1* | 3/2003 | Lau ............... G06F 3/0481 715/700 |
| 2003/0152262 A1 | 8/2003 | Mao et al. |
| 2004/0009459 A1 | 1/2004 | Anderson et al. |
| 2005/0122324 A1 | 6/2005 | Venkataraman |
| 2005/0143654 A1 | 6/2005 | Zuiderveld et al. |
| 2005/0237328 A1 | 10/2005 | Guhring |
| 2006/0094951 A1 | 5/2006 | Dean et al. |
| 2007/0012101 A1 | 1/2007 | Rottger et al. |
| 2008/0281182 A1 | 11/2008 | Rabben et al. |
| 2009/0097749 A1 | 4/2009 | Busch |
| 2009/0303236 A1 | 12/2009 | Buyanovskiy |
| 2011/0194742 A1* | 8/2011 | Buelow ............... G06T 7/11 382/128 |
| 2012/0224755 A1 | 9/2012 | Wu |
| 2012/0261848 A1 | 10/2012 | Haraszati |
| 2013/0009869 A1* | 1/2013 | Wilensky ......... G06F 3/04845 345/156 |
| 2013/0271449 A1 | 10/2013 | Lee et al. |
| 2014/0267603 A1* | 9/2014 | Kerdok ............ H04N 13/0018 348/43 |
| 2014/0314285 A1 | 10/2014 | Knoplioch |
| 2014/0362077 A1 | 12/2014 | Buyanovskiy |
| 2016/0148388 A1* | 5/2016 | De Witte ............. G06T 7/187 382/128 |

OTHER PUBLICATIONS

International Preliminary Report on Patentability received for PCT Patent Application No. PCT/US2014/066369, dated Jun. 2, 2016, 7 pages.
Non-Final Office Action received for U.S. Appl. No. 14/548,175, dated Feb. 12, 2016, 41 pages.
Foley et al. "Computer Graphics Principles and Practices", 2nd Edition, Addison Wesley Publishing Company, 1996, pp. 1134-1139.
International Search Report and Written Opinion received for PCT Patent Application No. PCT/US2014/066369, dated Feb. 19, 2015, 8 pages.
International Search Report and Written Opinion received for PCT Application No. PCT/US2016/56432, dated Jan. 9, 2017, 8 pages.
Extended European Search Report (includes Supplementary European Search Report and Search Opinion) received for European Patent Application No. 14863641.8, dated May 4, 2017, 6 pages.
International Preliminary Report on Patentability received for PCT Patent Application No. PCT/US2016/56432, dated Apr. 26, 2018, 7 pages.
Notice of Allowance received for U.S. Appl. No. 14/548,175, dated Oct. 19, 2016, 8 pages.
Extended European Search Report received for European Patent Application No. 16856036.5, dated Feb. 22, 2019, 8 pages.

* cited by examiner

METHODS AND SYSTEMS FOR INTERACTIVE 3D SEGMENTATION

CLAIM FOR PRIORITY

This application claims priority to U.S. Provisional Patent Application No. 62/241,660, filed on Oct. 14, 2015, for which the entire content is hereby incorporated by reference in its entirety for all purposes.

FIELD

The present disclosure relates generally to image processing. More particularly, the present disclosure relates to interactive segmentation and rendering of a two-dimensional (2D) or three-dimensional (3D) image.

BACKGROUND

Image segmentation is the process of partitioning a digital 2D or 3D image into multiple segments, e.g., sets of pixels for a 2D image or sets of voxels of a 3D image. A pixel is a basic element of a 2D image and represents a sample of the image. Similarly, a voxel is a basic element of a 3D image and represents a value on a grid in a 3D image. The current image segmentation technologies typically sets segmentation parameters ahead of time before the segmentation can begin. After the segmentation is performed using the current settings of the parameters, the segmentation results are provided for rendering and visualization. If the user is not satisfied with the segmentation and rendering results, the user may need to manually re-set or re-configure the segmentation parameters and repeat the segmentation and rendering process. This repeated segmentation is usually done in multiple manual steps. For example, to re-configure, the user needs to select each of the segmentation parameters he or she desires to change, and manually inputs in the new values. After the reconfiguration step, the user re-initiates the segmentation and rendering processes. And if the user is still not satisfied, the user needs to repeat the entire process including the reconfiguration, segmentation, and rendering steps. As a result, the user may be forced to repeat the process many time before a satisfactory segmented image can be obtained.

SUMMARY

Methods and Systems related to image segmentation are disclosed. In some embodiments, a computer system obtains segmentation parameters based on a selection of a region of a displayed image. The selection of the region is associated with a select signal generated by an input device. In response to obtaining the segmentation parameters, the computer system processes the image based on the segmentation parameters. The computer system further adjusts the segmentation parameters based on one or more move signals generated by the input device. The move signal is associated with moving of a representation of the input device within the image. The computer system processes the image based on the one or more adjusted segmentation parameters; and displays an image of the selected region based on the processing of the image using the adjusted segmentation parameters.

The terminology used in the description of the various described embodiments herein is for the purpose of describing particular embodiments only and is not intended to be limiting. As used in the description of the various described embodiments and the appended claims, the singular forms "a", "an," and "the" are intended to include the plural forms as well, unless the context clearly indicates otherwise.

It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The details of one or more embodiments of the subject matter described in the specification are set forth in the accompanying drawings and the description below. Other features, aspects, and advantages of the subject matter will become apparent from the description, the drawings, and the claims.

DETAILED DESCRIPTION

The following description sets forth exemplary systems and methods for image segmentation, e.g., 3D image segmentation. It should be recognized, however, that such description is not intended as a limitation on the scope of the present disclosure but is instead provided as a description of exemplary embodiments.

Figure 1:
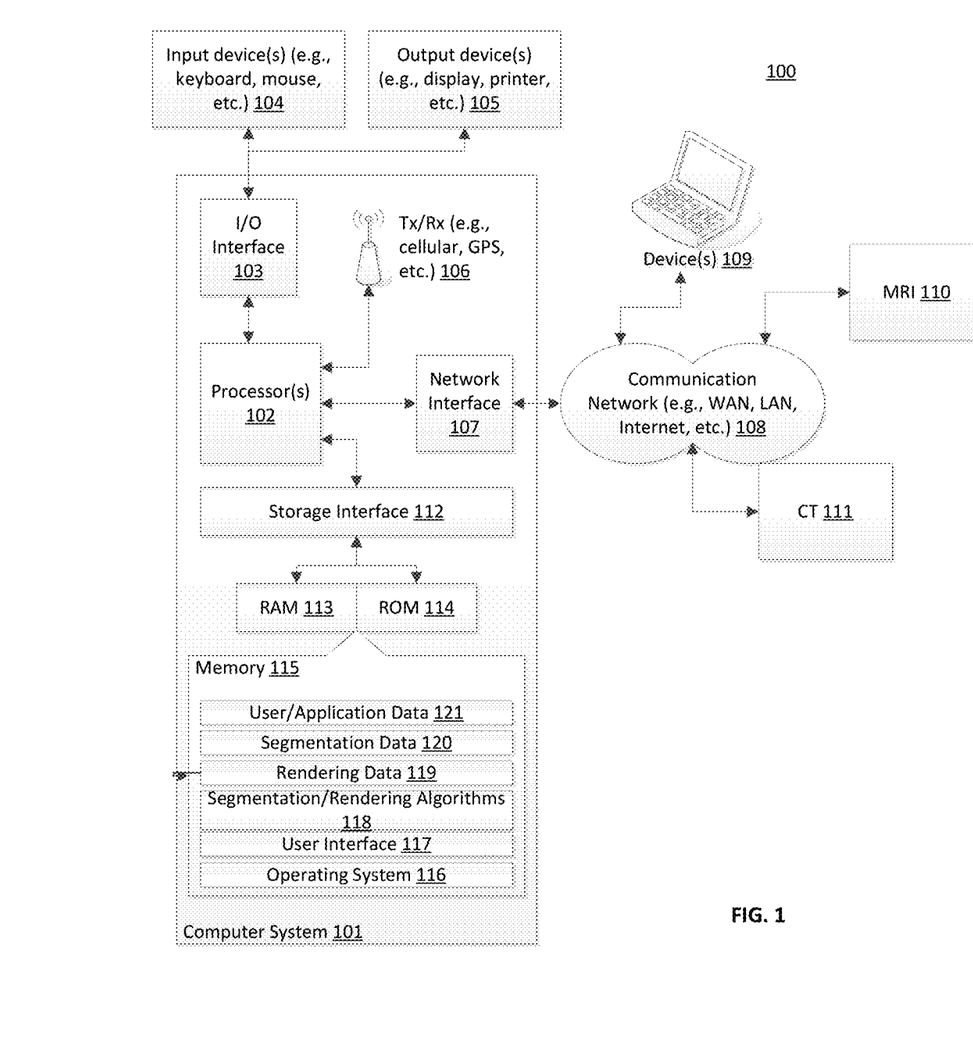
FIG. 1 illustrates an exemplary system for image segmentation, consistent with some embodiments of the present disclosure.
Figure 3:
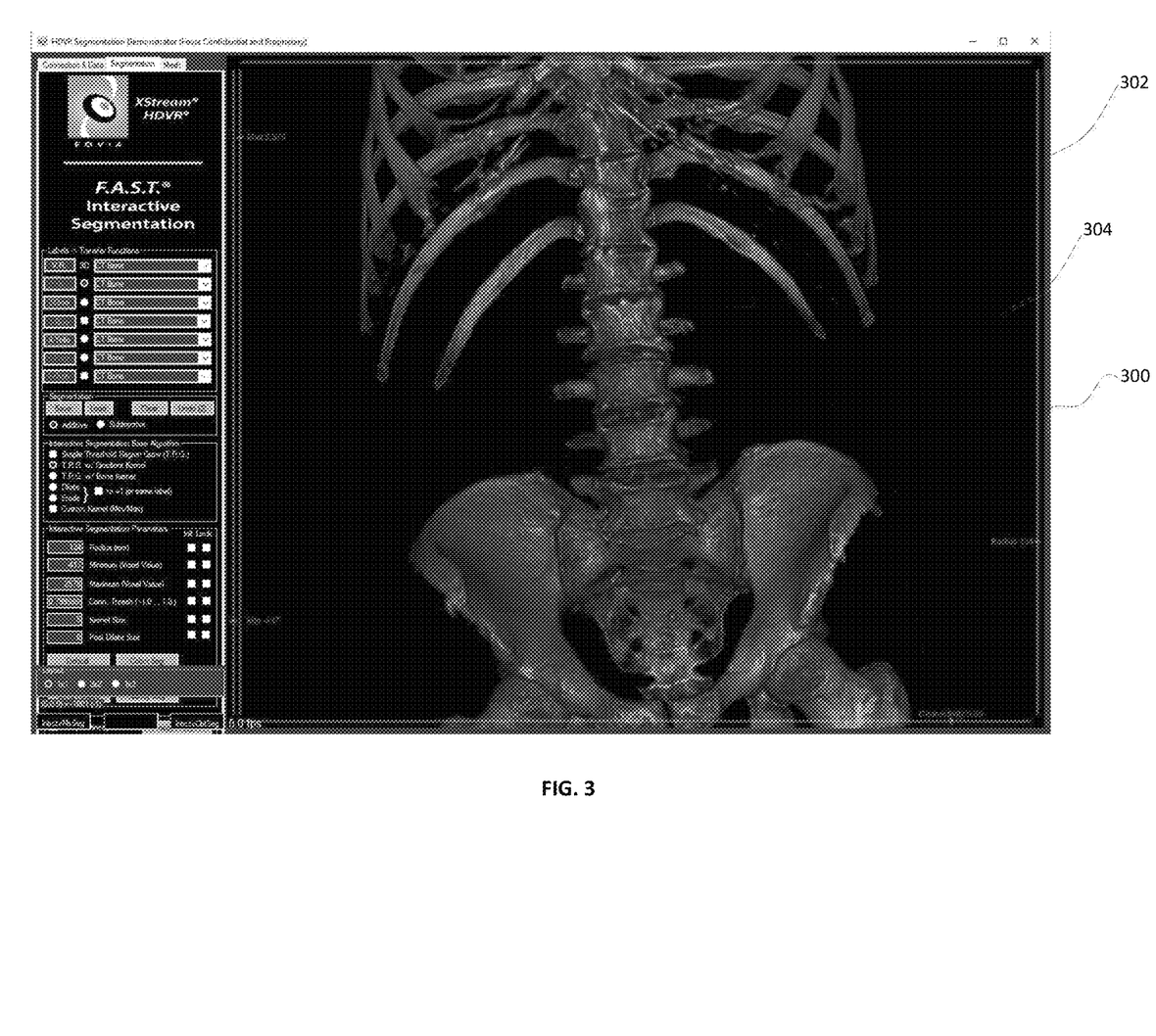
FIG. 3 illustrates an exemplary user interface providing an image of a segmentation process, consistent with some embodiments of the present disclosure.

FIG. 1 illustrates an exemplary system 100 for image segmentation, consistent with some embodiments of the present disclosure. Image segmentation is a process of partitioning a 2D or 3D digital image into multiple segments (e.g., sets of pixels, sets of voxels). Segmentation may simplify and/or change the representation of the image into something that is more meaningful or easier to analyze. Image segmentation can be used to locate objects and boundaries (lines, curves, etc.) in images. For example, image segmentation includes a process of assigning a label to every pixel/voxel in an image such that the pixels/voxels with the same label share certain characteristics. The result of image segmentation is a set of segments that collectively cover the entire image, or a set of contours extracted from the image. Each of the pixels/voxels in a region is similar with respect to some characteristics or computed properties, such as color, intensity, or texture. Adjacent regions may be significantly different with respect to the same characteristic(s). As a result, the segments or contours obtained by image segmentation can be used to generate or render 3D reconstructions using interpolation algorithms. An example of segments as a result of image segmentation is illustrated in FIG. 3, which is described in more detail below.

Referring to FIG. 1, system 100 may include a computer system 101, input devices 104, output devices 105, devices 109, Magnet Resonance Imaging (MRI) system 110, and Computed Tomography (CT) system 111. It is appreciated that one or more components of system 100 can be separate systems or can be integrated systems. In some embodiments, computer system 101 may comprise one or more central processing units ("CPU" or "processor(s)") 102. Processor(s) 102 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 102 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor(s) 102 may be disposed in communication with one or more input/output (I/O) devices via I/O interface 103. I/O interface 103 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using I/O interface 103, computer system 101 may communicate with one or more I/O devices. For example, input device 104 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, electrical pointing devices, etc. Output device 105 may be a printer, fax machine, video display (e.g., cathode ray tube (CRT), liquid crystal display (LCD), light-emitting diode (LED), plasma, or the like), audio speaker, etc. In some embodiments, a transceiver 106 may be disposed in connection with the processor(s) 102. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, processor(s) 102 may be disposed in communication with a communication network 108 via a network interface 107. Network interface 107 may communicate with communication network 108. Network interface 107 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. Communication network 108 may include, without limitation, a direct interconnection, local area network (LAN), wide area network (WAN), wireless network (e.g., using Wireless Application Protocol), the Internet, etc. Using network interface 107 and communication network 108, computer system 101 may communicate with devices 109. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, computer system 101 may itself embody one or more of these devices.

In some embodiments, using network interface 107 and communication network 108, computer system 101 may communicate with MRI system 110, CT system 111, or any other medical imaging systems. Computer system 101 may communicate with these imaging systems to obtain images for segmentation. Computer system 101 may also be integrated with these imaging systems.

In some embodiments, processor 102 may be disposed in communication with one or more memory devices (e.g., RAM 113, ROM 114, etc.) via a storage interface 112. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, flash devices, solid-state drives, etc.

The memory devices may store a collection of program or database components, including, without limitation, an operating system 116, user interface application 117, segmentation and rendering algorithm 118, rendering data 119, segmentation data 120, user/application data 121 (e.g., any data variables or data records discussed in this disclosure), etc. Operating system 116 may facilitate resource management and operation of computer system 101. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 117 may facilitate display, execution, interaction, manipulation, or operation of program components through textual or graphical facilities. For example, user interfaces may provide computer interaction interface elements on a display system operatively connected to computer system 101, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, computer system 101 may implement segmentation and rendering algorithms 118. Segmentation and rendering algorithms 118 include, for example, a minimum/maximum connected component region grow segmentation algorithm, a minimum/maximum connected component with gradient weighted stopping influence algorithm, a level-set algorithm, a watershed algorithm, a gradient-based algorithm, a floodfill algorithm, a thresholding algorithm, a blow/suck/lasso/balloon-physics-based algorithm, an Otsu's method of histogram clustering algorithm, a Vesselness algorithm, an one-click-bone-removal algorithm, a statistical algorithm, an example-patch AI algorithm, or an algorithm with or without dilation and erode. One or more of these algorithms may be used for segmenting images. Computer system 101 may also store the segmentation data 120 and rendering data 119. For example, memory 115 and/or a frame buffer (not shown) may be used for storing rendering data 119.

In some embodiments, computer system 101 may store user/application data 121, such as data, variables, and parameters (such as segmentation parameters) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

Disclosed embodiments describe systems and methods for image segmentation. The illustrated components and steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

Figure 2A:
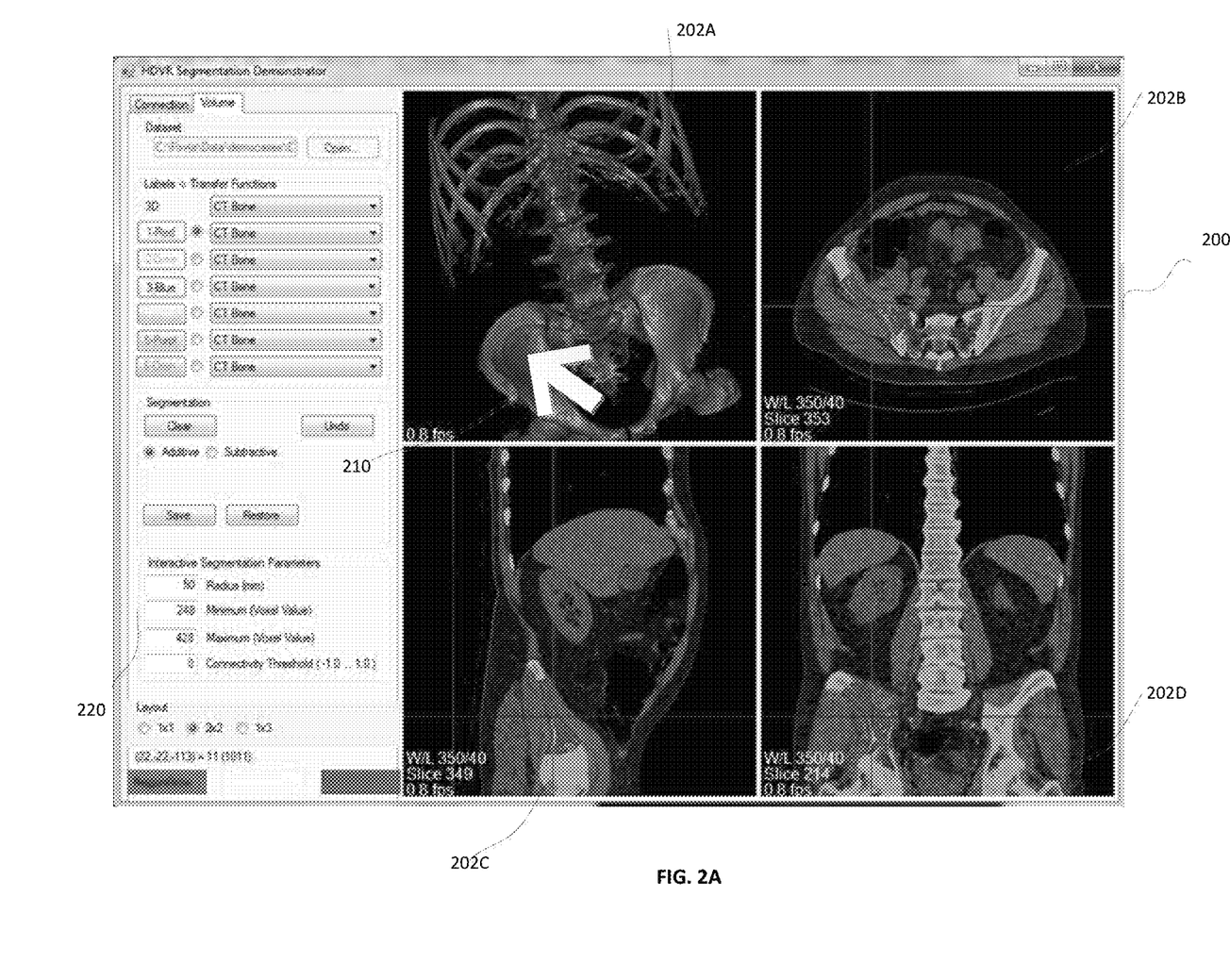
FIGS. 2A-2C illustrate exemplary user interfaces providing images of a segmentation process based on different segmentation parameters, consistent with some embodiments of the present disclosure.
Figure 2B:
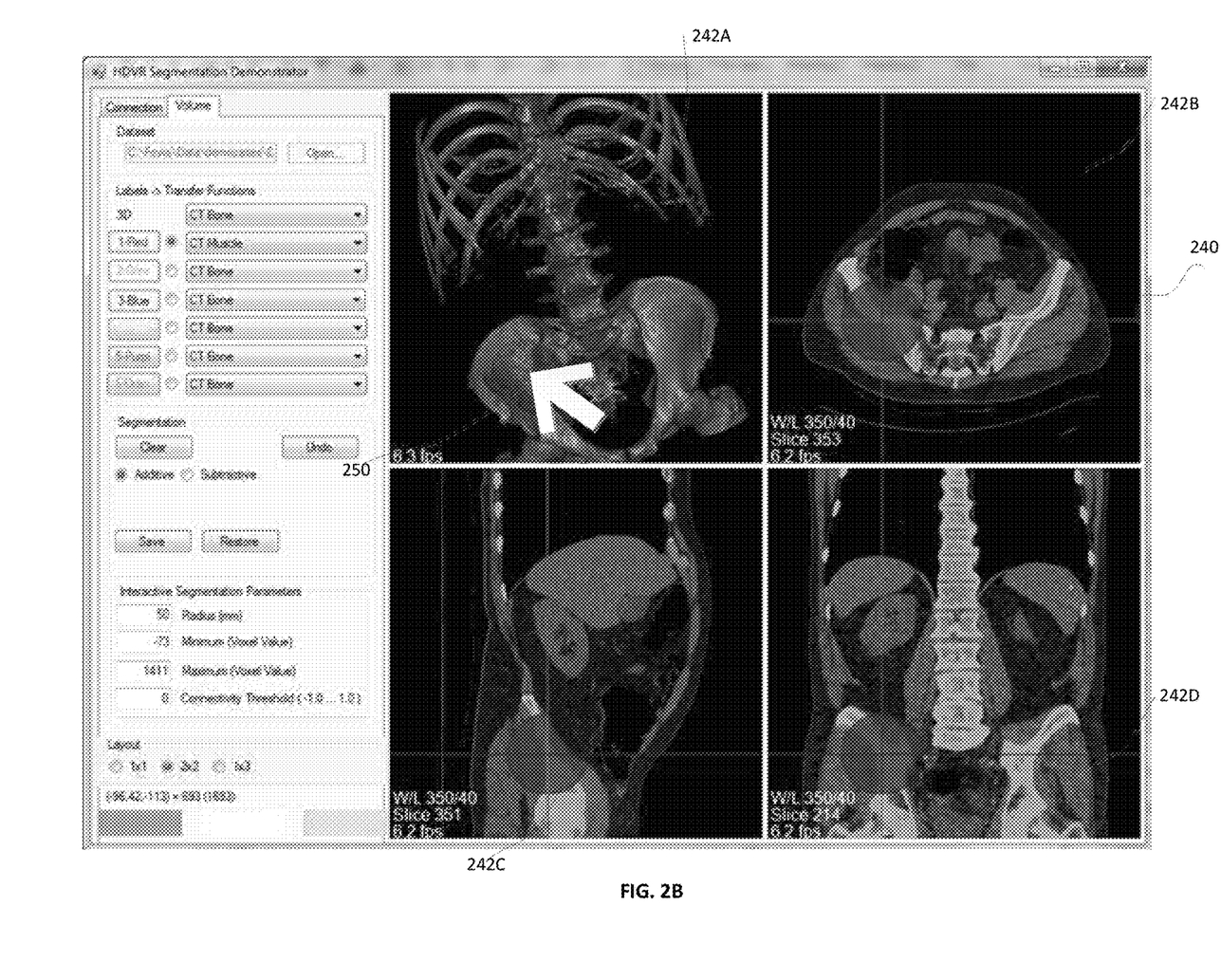
Figure 2C:
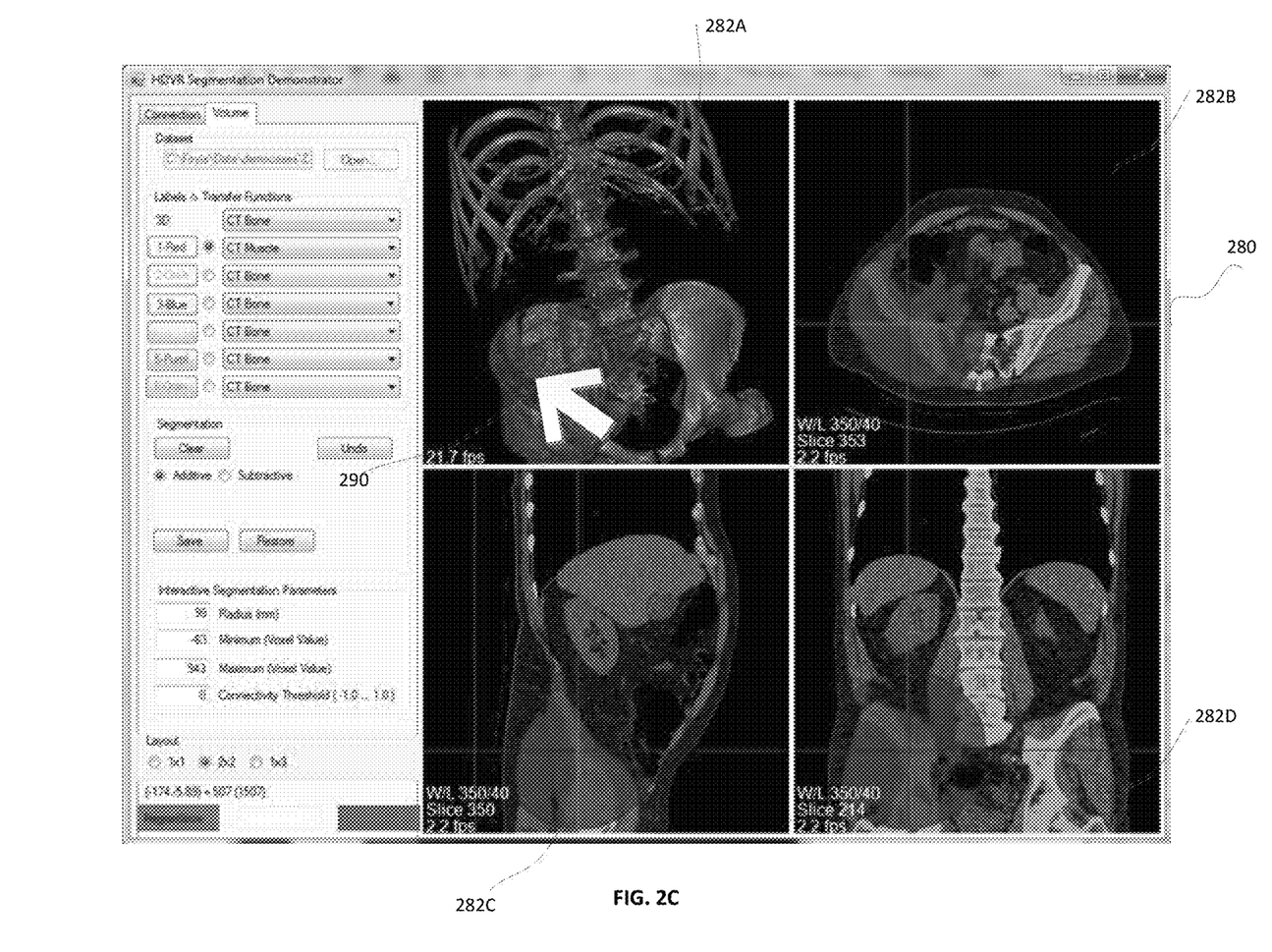

FIGS. 2A-2C depict exemplary user interfaces 200, 240, and 280 providing images under a segmenting process based on different segmentation parameters, consistent with some embodiments of the present disclosure. User interfaces 200, 240, and 280 may be provided by the user interface application 117 in FIG. 1. Referring to FIG. 2A, a computer system (e.g., computer system 101) displays an image 202A on user interface 200 of an output device (e.g., output device 105). As an example, image 202A may be a medical image showing portions of a human body. Images 202B-D illustrate different views and/or CT scan slices/layers of the same or different portions of the human body as shown in image 202A. For example, image 202C illustrates a side view of a CT scan slice number 349. Image 202A, and other images (e.g., images 202B-D), may also be displayed remotely at an output device of another computer system.

Segmentation of an image (e.g., image 202A) may enable the region of interest (e.g., the region of a pelvic bone as indicated by cursor 210 in FIG. 2A) to be separated and reconstructed for various purpose such as diagnosis, surgical planning, training, 3D printing, prosthetics/implants, lesion tracking, and measurements. In some embodiments, to segment image 202A, a user controls an input device (e.g., input device 104 such as a computer mouse) to select a region of image 202A. The selection of the region is associated with a signal generated by the input device. For example, using a mouse, a user clicks on an initial position within the region of interest as a starting point, thereby generating a select signal indicating the selection of the region. As shown in FIG. 2A, this initial position (e.g., the position indicated by cursor 210) may be located within the region of interest (e.g., the region showing the pelvic bone). The position that the cursor 210 points to represents the current position of the input device. In some segmentation algorithms, such as the region-growing algorithm, the initial position or starting point is also referred to as a seed point. From the seed point, the computer system can iteratively compare one pixel or voxel with its neighboring pixels or voxels to determine whether the neighboring pixels or voxels have similar characteristics. In some embodiments, the initial position is fixed and the user may click on anywhere within the region of interest to select that region.

After receiving the select signal generated by the input device, which indicates the region of interest for segmentation, the computer system can obtain one or more segmentation parameters. For example, based on the select signal, the computer system obtains the initial position or the seed point. In some embodiments, the computer system also obtains a minimum pixel/voxel value, a maximum pixel/voxel value, and a maximum number of iterations. In some segmentation algorithm, such as the region-growing algorithm, each pixel/voxel is associated with a value and is compared iteratively with the neighboring pixels/voxels. In this manner, the region of comparison grows from the seed point to neighboring pixels/voxels. In such algorithms, the minimum pixel/voxel value defines the minimum value such growing may occur and the maximum pixel/voxel value defines the maximum value such growing may occur. The maximum number of iterations defines the number of iteration of comparison that may take place during the segmentation of the region of interest.

In some embodiments, the one or more segmentation parameters may have default values and therefore the computer system may obtain the default values of these segmentation parameters. In some embodiments, the computer system may obtain, at least initially, the one or more parameters from user's input. For example, as illustrated in FIG. 2A, the computer system can display an input region 220 on user interface 200 for receiving user's input of the segmentation parameters.

After obtaining the one or more segmentation parameters, the computer system may perform segmentation using the segmentation parameters. For example, the computer system may compare voxel values of neighboring voxels to the value of a voxel at the seed point, and iteratively compare and grow the region of comparison. The computer system may complete the segmentation process if a minimum pixel/voxel value, a maximum pixel/voxel value, and/or a maximum number of iterations has been reached. Following the completion of the segmentation, the computer system may use the segmentation results to render, for example, a 3D image of the region of interest (e.g., the pelvic bone region as shown in FIG. 2A). An exemplary rendering result is illustrated in FIG. 3.

Often times, the user may find the reconstructed or rendered 3D image of the region of interest unsatisfactory or less desired. The user may wish to adjust the segmentation parameters to obtain a more satisfactory result. In some embodiments, the user may adjust the segmentation parameters by manually typing in the new parameters, for example, input region 220. Such manual adjustment may require the user to know the value of the parameters and may be time consuming and cumbersome if the user is required to make the adjustment multiple times.

In some embodiments, the user may adjust the segmentation parameters by moving the input device in certain directions. Referring to FIG. 2A, as an example, the user may control the input device (e.g., press a button on a computer mouse) to select an initial position (e.g., a starting point indicated by the cursor 210) within a region of interest in the image 202A. Without releasing the control of the input device (e.g., releasing the mouse button), the user can move the input device (e.g., drag the mouse) to adjust one or more of the segmentation parameters. The motion of the input device causes the cursor 210 to move in a corresponding direction, which may be substantially horizontal, substantially vertical, or in any desired directions or motions (e.g., a circular motion). In some embodiments, the motion of the input device is associated with the adjusting the one or more segmentation parameters. For example, a substantially horizontal motion of the input device or the cursor 210 may be associated with adjusting the minimum pixel or voxel values or adjusting the maximum pixel or voxel values. A substantially vertical motion of the input device or the cursor 210 may be associated with adjusting the number of iterations. It is appreciated that a segmentation parameter can be associated with any desired motion of the input device or the cursor 210. Further, two or more segmentation parameters can be associated with or mapped to one motion of the input device or the cursor 210. The detail of such mapping is further illustrated below in more detail using FIG. 5. In some embodiments, the motion-parameter association or mapping is stored in a database (e.g., segmentation data 120 and/or user/application data 121 of memory 115, as illustrated in FIG. 1).

Based on the motion of the input device or the cursor 210, the input device or the cursor 210 can generate move signals. The computer system can detect the motion of the input device or the cursor 210 corresponding to such move signals. Based on the detected motion, the computer system can determine the corresponding one or more segmentation parameters. For example, if the computer system detects that the input device or the cursor 210 performs a substantially vertical motion, the computer system retrieves the preconfigured motion-parameter association or mapping from a database and determines that the substantially vertical motion is associated or mapped to the number of iterations. Further, using the preconfigured association or mapping, the computer system can also determine, for example, that a substantially upward vertical motion is associated with or mapped to increasing the number of iterations, and a substantially downward vertical motion is associated with or mapped to decreasing the number of iterations.

Similarly, using the preconfigured association or mapping, the computer system can also determine that a substantially horizontal motion toward the left is associated with or mapped to decreasing the minimum/maximum pixel or voxel values, and a substantially horizontal motion toward the right is associated with or mapped to increasing the minimum/maximum pixel or voxel values. Further, in some embodiments, the motion may be substantially circular, elliptical, or any other shaped. For example, a substantially circular motion may be associated with the parameter of stopping weight, which influences, for example, the growing operation of a segmentation process by adjusting the thresholds of the other region grow parameters using a weighted combination of the parameters to halt the growth before the other parameters would have halted on their own. A substantially clockwise circular motion may be associated with increasing the stopping weight and a substantially counterclockwise motion may be associated with decreasing the stopping weight. It is appreciated that the direction or shape of the motion can be associated with or mapped to any desired actions for adjusting the segmentation parameters.

Based on the determination of one or more segmentation parameters that are associated with the detected motion, the computer system can adjust the segmentation parameters. For example, if the computer system determines that the number of iteration is associated with a substantially vertical motion, it increases or decreases the number of iteration depending on whether the substantially vertical motion is upward or downward. In response to the adjusting of the segmentation parameters, the computer system can perform the segmentation process using the adjusted parameters. The segmentation process may use any desired algorithms such as a minimum/maximum connected component region grow segmentation algorithm, a minimum/maximum connected component with gradient weighted stopping influence algorithm, a level-set algorithm, a watershed algorithm, a gradient-based algorithm, a floodfill algorithm, a thresholding algorithm, a blow/suck/lasso/balloon-physics-based algorithm, an Otsu's method of histogram clustering algorithm, a Vesselness algorithm, an one-click-bone-removal algorithm, a statistical algorithm, an example-patch AI algorithm, or an algorithm with or without dilation and erode.

In some embodiments, the computer system adjusts the parameters of the segmentation based on the movement of screen input controls. The screen input controls may be in any desired form such as knobs, sliders, dials, buttons, levers, wheels, or any similar structure. After receiving a select signal from the user, the computer system may show the screen input controls. The user may then use an input device to adjust the screen input controls to increase or decrease any of the desired segmentation parameters. For example, referring to FIG. 3, the computer system detects a selection of a region for segmentation in response to a click by a mouse controlled by the user. The computer system then displays the screen input controls (302) in the form of sliders along the outside of the interface (304). The user may then use the mouse to move a control along the slider to adjust the desired segmentation parameter.

In some embodiments, the computer system performs the segmentation using the adjusted parameters and then provides the segmentation result for rendering of an image on user interface 200. The computer system then renders or reconstructs an image of the selected region using the segmentation results. For example, the computer system can use the segmentation results to generate 3D reconstructions of the selected region based on interpolation algorithms (e.g., Marching cubes algorithm).

In some embodiments, the computer system can adjust the segmentation parameters, segment using the adjusted parameters, and render an image of the selected region interactively or in real time. For example, referring to FIG. 2A, the computer system detects a selection of a region for segmentation in response to a click by a mouse controlled by the user. The computer system obtains the initial position (e.g., the position indicated by cursor 210) and other default or initial segmentation parameters, and begins the segmentation and rendering. The computer system displays the segmentation and rendering results on screen 200 (e.g., the red colored/shaded region of images 202A-D). In some embodiments, the segmentation and rendering process may be completed in a relatively short period of time (e.g., while the user is holding down the mouse). Viewing the rendering results, the user may determine that the results are not satisfactory and thus move the mouse for adjusting the segmentation parameters. The computer system detects such motion of the mouse and adjusts the segmentation parameters accordingly, while the user is still holding down the mouse. The computer system then provides segmentation results based on the adjusted result for rendering and displays the updated rendering results.

This process of interactively parameter adjusting, segmenting, and rendering can be repeated until, for example, the user releases the control of the input device (e.g., releasing the mouse button). In response to the releasing the control of the input device, the computer system detects an unselect signal generated by the input device, stops adjusting the segmentation parameters, and stops the segmentation and rendering process. In some embodiments, the input devices generates the unselect signal without generating an intervening or intermediate select signal or unselect signal. As an example, after the initial clicking of a mouse button to select the initial position, a user may hold down and drag the mouse to include more structures in the selected region (e.g., the region showing in red/shaded in images 202A-D of FIG. 2A). The motion of the mouse (e.g., dragging the mouse horizontally) causes the computer system to adjust the segmentation parameters until the user is satisfied with the rendering result of the interested or selected region (e.g., the left pelvic bone region showing in red/shaded in image 202A of FIG. 2A). The computer system determines that the user is satisfied with the segmentation and rendering results if it detects an unselect signal associated with the releasing of the mouse button.

As another example, the user may move the mouse to cause the computer system to increase the region of the segmentation until portions of structure the user does not wish to include is segmented. The user then releases the mouse. The computer system detects such release by detecting an unselect signal and stops the segmentation process. In some embodiments, the user may also move the mouse slightly back the other direction until the undesirable portions of the structure disappears from the segmentation. In response, the computer system detects such backward motion, adjusts the corresponding parameters accordingly, segments using the adjusted parameters, and updates the rendering results. As a result, the computer system can provide a satisfactory segmentation and rendering results to the user interactively or in real time, and the user may obtain the result in one action (e.g., click the mouse—drag the mouse—unclick the mouse).

Using the input device motion for adjusting the segmentation parameters allow the user to dynamically interact with the segmentation and rendering process. The user does not need to manually adjust the segmentation parameters in, for example, input region 220. Instead, the user can simply move the mouse to cause the computer system to adjust the segmentation parameters and provide updated segmentation/rendering results. In some embodiments, for obtaining such real-time processing, the hardware and/or the software of the computer system may be configured to enable the required processing speed and/or memory capacity to match the frame rate of updating the rendering results. As an example, the frame rate may be 10-15 frames per second (fps). For matching such a frame rate, the computer system may include, for example, two or more processors and a desired memory capacity. As another example, the hardware and/or software of the computer system may also have a structure similar to the Single Instruction Multiple Data (SIMD) structure described in Chapter 5 of "Hybrid Rendering and Process for Volume Visualization," a dissertation by Kevin Augustus Kreeger to the Graduate School in Partial Fulfillment of the Requirements for the Degree of Doctor of Philosophy in Computer Science, State University of New York at Stony Brook (Appendix A).

In some embodiments, the computer system can cause the user interface 200 to display the segmentation parameters in the input region 220 of the user interface 200 based on the motion of the input device. For example, while the user is moving the input device, the adjusted segmentation parameters may be displayed in the input region 220. Further, the user interface 200 also provides a plurality of control functions, such as open, save, restore, clear, and undo. For example, a "save" function enables the user to save the segmentation parameters to a file or database. A "restore" function enables the user to restore previously saved segmentation parameters. A "clear" function enables the user to remove or reset all the current segmentation parameters. An "undo" function enables the user to undo or cancel the one or more previous inputs of the segmentation parameters. An "open" function enables the user to open a previously saved segmentation data file. These control functions of the user interface 200 are illustrative and it is appreciated that any other desired functions can be incorporated or provided in the user interface 200.

The user interface 200 can also provide labels. Image segmentation represents a process of assigning a label to every pixel/voxel in an image such that pixels/voxels with the same label share certain characteristics. The user interface 200 of FIG. 2A illustrates different colored labels may be assigned to different portions of the image 202A. For example, the red color is assigned to the left pelvic bone region, and therefore that region is shown in red on images 202A-D.

FIGS. 2A-2C further illustrate user interfaces providing images of segmentation processes based on different segmentation parameters. For example, the user interface 200 of FIG. 2A illustrates the segmentation results from the initial position (e.g., the position indicated by the cursor 210) after 50 iterations (e.g., radius) with the minimum/maximum voxel values only including the pelvic bone (showing in red/shaded of images 202A-D). FIG. 2B illustrates the segmentation results from the initial position (e.g., the position indicated by cursor 250) after 50 iterations with minimum/maximum voxel values including the pelvic bone and the muscles (showing in red/shaded of images 242A-D). FIG. 2C depicts the segmentation results from the initial position (e.g., the position indicated by cursor 290) after 100 iterations with minimum/maximum voxel values including both the pelvic bone and the muscles (showing in red/shaded of images 282A-D). As described above, in some embodiments, the computer system adjusts these segmentation parameter based on the signals generated by the input device, which represent the motion of the input device. Therefore, to adjust segmentation parameters and view the updated rendering results, the user can, for example, just click on the pelvic bone region and move the mouse to adjust the segmentation parameters for obtaining the desired segmented results.

Figure 4:
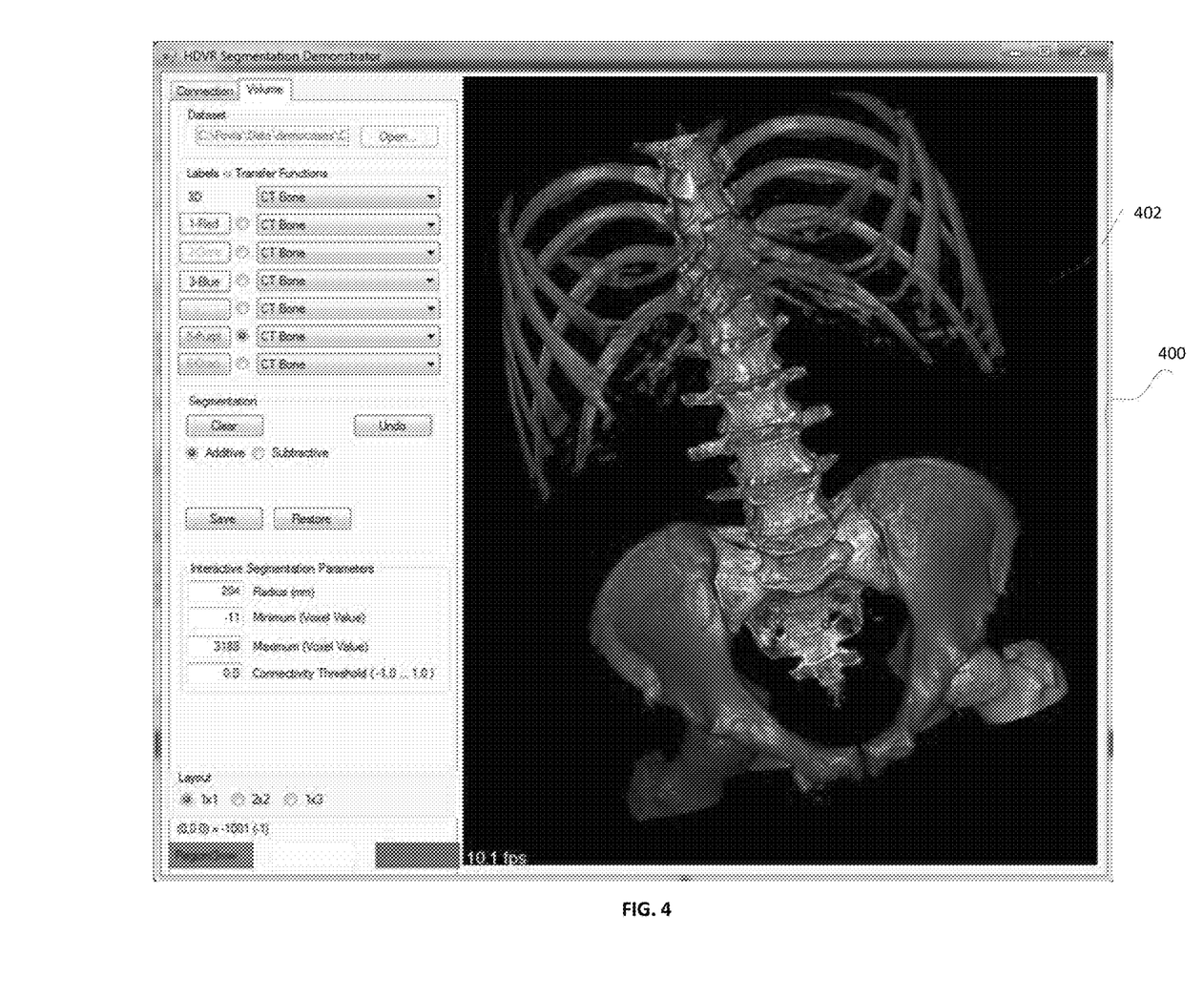
FIG. 4 illustrates an exemplary user interface providing an image illustrating segmented regions, consistent with some embodiments of the present disclosure.

FIG. 4 illustrates an exemplary user interface 400 providing an image illustrating segmented regions, consistent with some embodiments of the present disclosure. For example, the user interface 400 provides a rendered or reconstructed 3D image 402 of five segmented regions, each being assigned a different label (e.g., a different color, shades, or textures). In some embodiments, the image 402 is rendered or reconstructed using, for example, interpolation algorithms based on the segmentation results. In some embodiments, to obtain the image 402 as illustrated in FIG. 4, the computer system can repeat the segmentation and rendering process as described above with different initial positions corresponding to different regions of segmentation. For example, if the computer system detects a selection of the spine region (e.g., selection by a mouse click of a starting point within the spine region), it begins the segmentation of the spine region and adjusts the segmentation parameters based on the motion of the input device controlled by the user, similar to those described above for segmenting the pelvic bone region.

Figure 5:
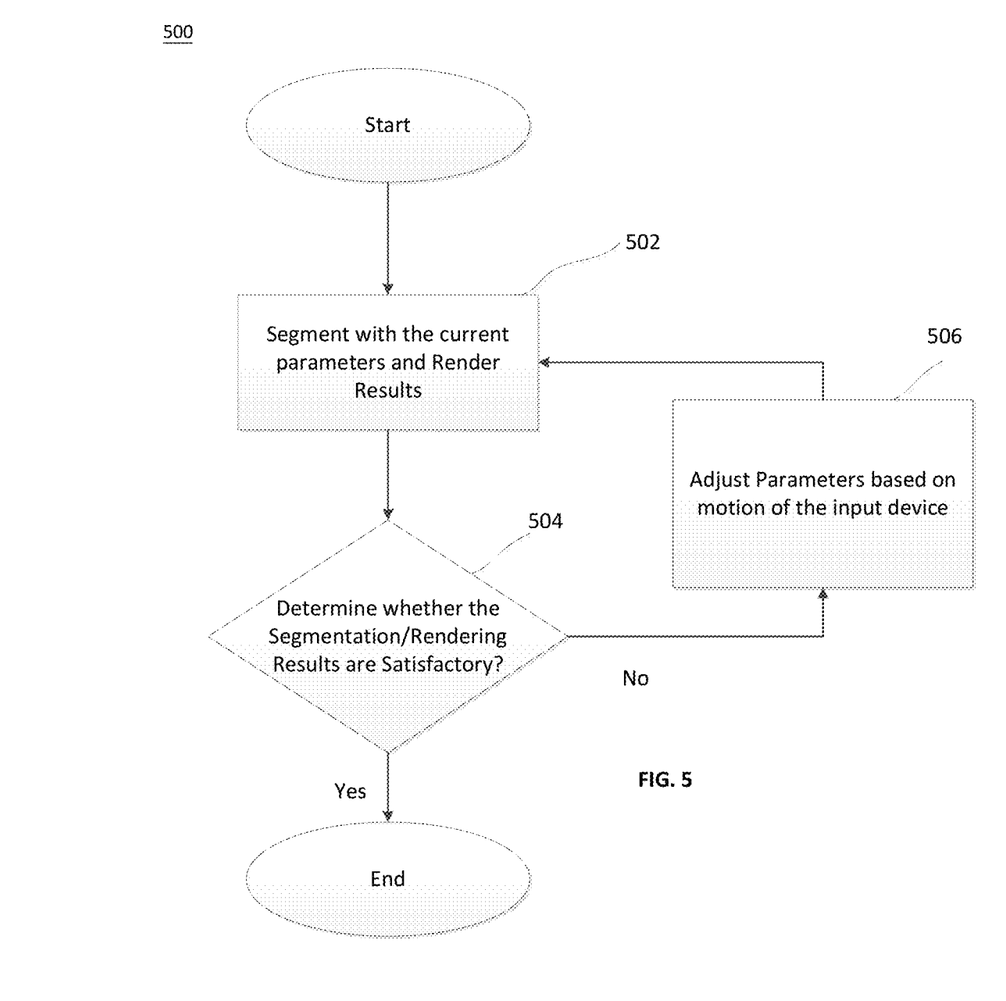
FIG. 5 illustrates a flow chart of an exemplary process for segmenting and rendering of an image, consistent with some embodiments of the present disclosure.

FIG. 5 illustrates a flow chart of process 500 for segmenting and rendering of an image, consistent with some embodiments of the present disclosure. Some features of the process 500 are illustrated in FIGS. 1, 2A-2C, 3, and 4 and accompanying descriptions. In some embodiments, the process 500 is performed by a computer system (e.g., computer system 101 in FIG. 1).

In the process 500, a computer system (e.g., computer system 101 in FIG. 1) having one or more processors and memory segments an image with the current segmentation parameters and renders the results (step 502) for displaying on an output device (e.g., output device 105). For example, in step 502, the computer system detects a selection of a region of a displayed image. The selection of the region is associated with a select signal generated by an input device (e.g., the input device 104 such as a mouse, a stylus, a joystick, or an electrical pointing device). The input device may be controlled by a user. For example, using the input device, the user may indicate an initial position (e.g., a starting point) for segmentation. In some embodiments, the initial position for segmentation of a selected region is fixed.

Based on the detection, the computer system obtains one or more segmentation parameters. In response to obtaining the one or more segmentation parameters, the computer system segments the image based on the one or more segmentation parameters and renders an image of the selected region.

In some embodiments, the displayed image is a two-dimensional image or a three-dimensional image. The displayed image may include one or more regions corresponding to, for example, one or more portions of a human body. It is appreciated that the displayed image may include regions corresponding to any type of contents other than portions of a human body.

In some embodiments, the displayed image is displayed on a user interface with at least one of: one or more segmentation parameters, one or more control buttons, or one or more labels. The one or more labels are assigned to the pixels or voxels within the one or more corresponding regions of the image. The one or more segmentation parameters include, for example, an initial position, a minimum pixel or voxel value, a maximum pixel or voxel value, a number of iterations, and a stopping weight.

In some embodiments, the computer system determines (step 504) whether the user is satisfied with the segmentation and/or rendering results. As an example, the computer system determines whether the user is satisfied by detecting whether an unselect signal is generated by the input device. An unselect signal may be generated if the user, for example, releases or no longer holds down a mouse button. If the computer system detects such unselect signal, it determines that the user is satisfied with the current segmentation and/or rendering results, and the process 500 proceeds to an end. If the computer system does not detect such unselect signal, it determines that the user is not satisfied with the current segmentation and/or rendering results. In some embodiments, the process 500 may proceed to adjust (step 506) one or more segmentation parameters.

In some embodiments, for adjusting the segmentation parameters, the computer system detects one or more motions of the input device. Such detection can be based on detecting one or more move signals generated by the input device. Based on the detected motions of the input device, the computer system determines the one or more segmentation parameters associated with the motions. For example, to determine which segmentation parameter corresponds to the detected motion, the computer system can use a previously stored mapping of the segmentation parameters to the motions of the input device. After such determination, the computer system adjusts the corresponding segmentation parameters.

In some embodiments, according to the adjusted segmentation parameters, the computer system again segments the image and renders an updated image of the selected region (step 502). The computer system can repeat steps 502, 504, and 506 until it determines that the user is satisfied with the current segmentation and/or rendering results.

FIG. 5 is merely illustrative of a method for segmenting and rendering of an image. The illustrative discussions above are not intended to be exhaustive or to limit the invention to the precise form disclosed. Many modifications and variations are possible in view of the above teachings.

Figure 6:
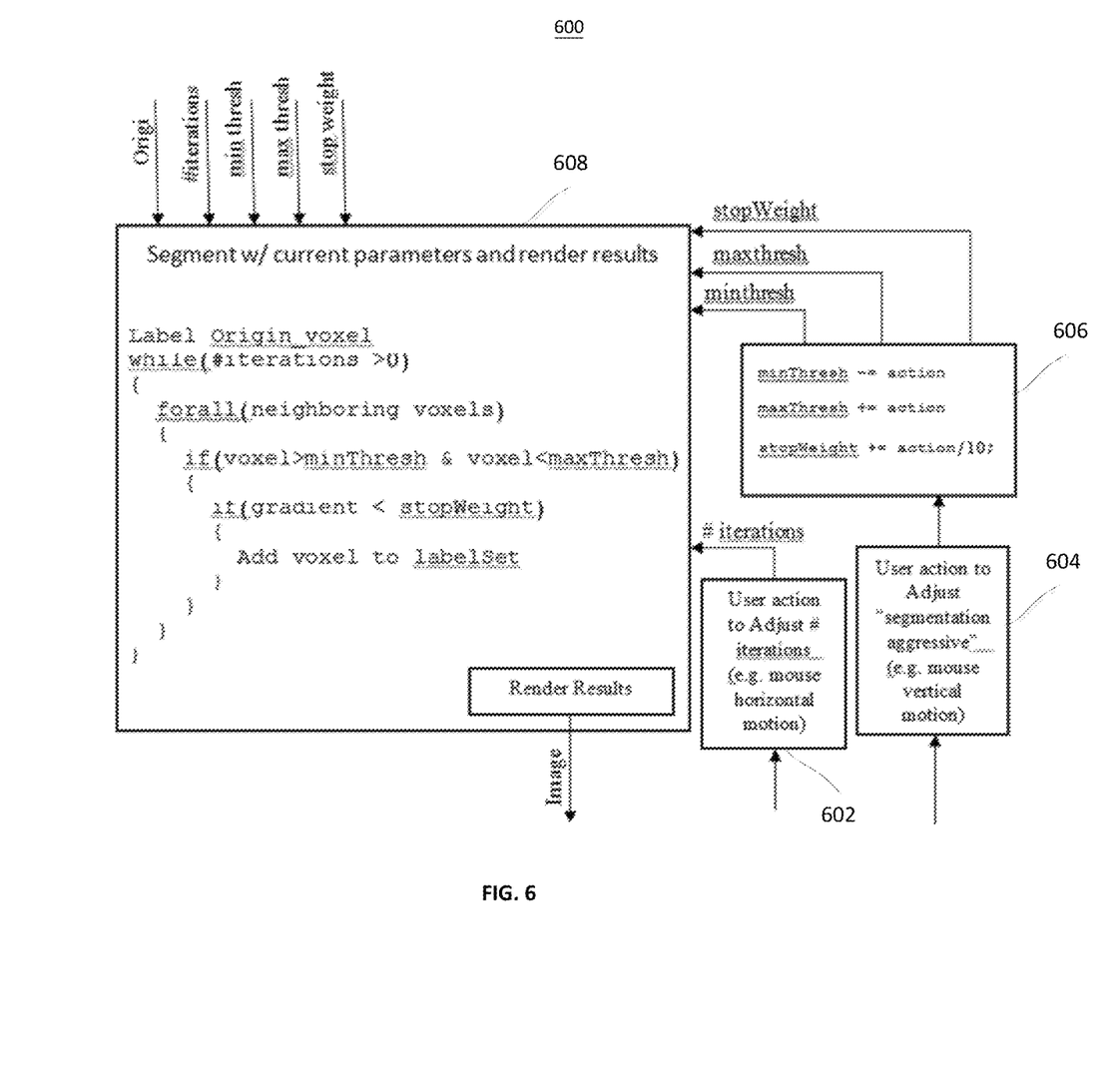
FIG. 6 illustrates a flow chart of an exemplary process for segmenting and rendering based on mapping of two or more parameters to one motion of an input device, consistent with some embodiments of the present disclosure.

FIG. 6 illustrates a flow chart of an exemplary process 600 for segmenting and rendering based on mapping of two or more parameters to one motion of an input device, consistent with some embodiments of the present disclosure.

In the process 600, two or more of the segmentation parameters are mapped through a combining algorithm to a single motion of the input device. As an example, in the minimum/maximum connected component with gradient weighted stopping algorithm, five parameters (e.g., the initial position, the number of iterations, the minimum pixel/voxel value, the maximum pixel/voxel value, and the stopping weight) may be required for segmentation. In some embodiments, the computer system (e.g., the computer system 101) can map each one of the five parameters to a different motion of the input device (e.g., the input device 104). For example, the computer system maps the number of iterations to a substantial horizontal motion of the input device; and maps the initial position to the position where the input device selects (e.g., the position that the user clicks using a mouse).

In some embodiments, the computer system can map one parameter to a motion of the input device, and map two or more parameters to another motion of the input device. For example, the computer system can map the number of iterations to a substantial horizontal motion of the input device, and map three parameters (e.g., the minimum pixel/voxel value, the maximum pixel/voxel value, and the stopping weight) to a substantially vertical motion of the input device. As illustrated in FIG. 6, in the process 600, the computer system detects (step 602) that the input device generates a move signal that indicates a substantially horizontal motion of the input device. The computer system determines, based on the previously stored mapping, that the substantially horizontal motion is associated with the number of iteration parameter. The computer system may thus adjust the number of iteration parameter accordingly.

In the process 600, the computer system detects (step 604) that the input device generates a move signal that indicates a substantially vertical motion of the input device. The computer system determines, based on the previously stored mapping, that the substantially vertical motion is associated with three parameters (e.g., the minimum pixel/voxel value, the maximum pixel/voxel value, and the stopping weight). Various algorithms may be used to implement the mapping of the two or more parameters to a single motion of the input device. In one such algorithm, the computer system may interpret the substantial vertical motion in the upward direction as meaning that the user desires to be more aggressive on segmentation (i.e., segmenting more); and interpret the substantial vertical motion in the downward direction as meaning that the user desires to be less aggressive on segmentation (i.e., segmenting less). The computer system can thus adjust the associated segmentation parameters based on such interpretation. For example, if the computer system detects a substantial vertical motion in the upward direction, it may decrease the minimum pixel/voxel value by a preconfigured number, increase the maximum pixel/voxel value by a preconfigured number, and/or increase the stopping weight (step 606). It is appreciated that any other algorithms may be used to map two or more segmentation parameters to a single motion of the input device. Further, when performing the segmentation, the computer system can use, for example, a heuristical or stochastic algorithm to interpret or map the single motion of the input device to two or more parameters such that each parameter is adjusted according to the algorithm.

In the process 600, based on the adjusted segmentation parameters, the computer system segments with the adjusted parameters and renders the image of the selected region (step 608). For example, for segmentation, the computer system determines whether the remaining number of iteration is greater than zero. If the remaining number of iterations is greater than zero, the computer system compares the values of all the neighboring voxels of the current voxel (e.g., the voxel at the initial position) with the value of the current voxel. If the value of the neighboring voxel is greater than the minimum voxel value and is less than the maximum voxel value, the computer system further determines whether the gradient of the neighboring voxel is less than the stopping weight. If it is less than the stopping weight, the corresponding neighboring voxel is added to a certain set of label.

In the process 600, for example, the five segmentation parameters (e.g., the initial position, the number of iterations, the minimum pixel/voxel value, the maximum pixel/voxel value, and the stopping weight) are mapped to three motions of the input device (e.g., the mouse click, the substantial horizontal motion, and the substantial vertical motion). This kind of mapping reduces the control effort of the user. Further, mapping multiple parameters to a single motion reduces or eliminates the requirement that the user must understand how the parameters interact with each other in order to adjust the parameters. For example, in process 600, the user can adjust the segmentation parameters based on whether he or she desires more or less segmentation. The user is not required to know what parameters he or she needs to adjust or how these parameters interact with each other. As a result, the segmentation user interface is more intuitive.

Further, the illustrated segmentation methods (e.g., the processes 500 and 600) described in the present disclosure enable more efficient segmentation of different types of structures. Some prior segmentation algorithms may be highly tuned or adapted to one specific structure and thus would not perform efficiently or effectively on other structures. The segmentation methods described in the present disclosure allow the segmentation parameters to be initialized based on intuitive user interaction, followed by adjustments through continual user interactions. As a result, such segmentation methods can provide efficient and effective segmentation of a variety of different structures.

It should be noted that, despite references to particular computing paradigms and software tools herein, the computer program instructions with which embodiments of the present subject matter may be implemented may correspond to any of a wide variety of programming languages, software tools and data formats, and be stored in any type of volatile or nonvolatile, non-transitory computer-readable storage medium or memory device, and may be executed according to a variety of computing models including, for example, a client/server model, a peer-to-peer model, on a stand-alone computing device, or according to a distributed computing model in which various of the functionalities may be effected or employed at different locations. In addition, references to particular algorithms herein are merely by way of examples. Suitable alternatives or those later developed known to those of skill in the art may be employed without departing from the scope of the subject matter in the present disclosure.

It will also be understood by those skilled in the art that changes in the form and details of the implementations described herein may be made without departing from the scope of this disclosure. In addition, although various advantages, aspects, and objects have been described with reference to various implementations, the scope of this disclosure should not be limited by reference to such advantages, aspects, and objects. Rather, the scope of this disclosure should be determined with reference to the appended claims.

The invention claimed is:

1. A computer-implemented method for image segmentation, comprising:
   at a computer system including one or more processors and memory,
   obtaining one or more segmentation parameters based on a selection of a region of a first displayed image, the selection of the region based on a position of a cursor overlaying the first displayed image and a select signal generated by an input device;
   determining a seed point from the position of the cursor overlaying the first displayed image and the select signal, wherein the seed point provides an initial position within the first displayed image for processing;
   in response to obtaining the one or more segmentation parameters, processing the first displayed image based on the one or more segmentation parameters and the seed point;
   adjusting the one or more segmentation parameters based on one or more move signals generated by the input device while the select signal is maintained, wherein the cursor overlaying the first displayed image moves in relation to the move signal;

processing the first displayed image based on the one or more adjusted segmentation parameters to generate a second displayed image, the second displayed image a segmentation of the first displayed image: and overlaying the second displayed image over the selected region, wherein the second displayed image is at least partially transparent such that first displayed image is visible through the second displayed image.

2. The method of claim 1, wherein the first displayed image is a two-dimensional image or a three-dimensional image.

3. The method of claim 1, wherein the first displayed image includes one or more regions corresponding to one or more portions of a human body.

4. The method of claim 1, wherein the first displayed image is displayed with at least one of: the one or more segmentation parameters, one or more control buttons, or one or more labels indicating one or more corresponding regions of the first displayed image.

5. The method of claim 1, wherein the one or more segmentation parameters include at least one of: an initial position, a minimum pixel or voxel value, a maximum pixel or voxel value, a number of iterations, or a stopping weight.

6. The method of claim 5, wherein the initial position associated with the selected region for processing is fixed.

7. The method of claim 1, wherein the input device is a mouse, a stylus, a joystick, or an electrical pointing device.

8. The method of claim 1, wherein processing the first displayed image based on the one or more segmentation parameters comprising:

segmenting the first displayed image based on the one or more segmentation parameters; and in response to segmenting the first displayed image, rendering an initial image of the selected region.

9. The method of claim 1, wherein the one or more move signals are generated following the select signal without an intervening select or unselect signal.

10. The method of claim 1, wherein prior to adjusting the one or more segmentation parameters, further comprising mapping the one or more segmentation parameters to one or more motions of the input device, the one or more motions including at least one of: a select action, a horizontal motion, or a vertical motion.

11. The method of claim 10, wherein adjusting of the one or more segmentation parameters based on the one or more move signals comprising:

detecting one or more motions of the input device corresponding to the one or more move signals;

determining, based on the mapping of the one or more segmentation parameters to the one or more motions, the one or more segmentation parameters associated with the detected one or more motions; and adjusting the one or more segmentation parameters based on the determination.

12. The method of claim 11, wherein mapping of the one or more segmentation parameters comprising mapping two or more segmentation parameters to one motion of the input device.

13. The method of claim 1, wherein processing the first displayed image based on the one or more adjusted segmentation parameters is further based on at least one of: a gradient-based algorithm, a minimum/maximum connected component region grow segmentation algorithm, a minimum/maximum connected component with gradient weighted stopping influence algorithm, a level-set algorithm, a watershed algorithm, a floodfill algorithm, a thresholding algorithm, a blow/suck/lasso/balloon-physics-based algorithm, an Otsu's method of histogram clustering algorithm, a Vesselness algorithm, an one-click-bone-removal algorithm, a statistical algorithm, an example-patch AI algorithm, or an algorithm with or without dilation and erode.

14. The method of claim 1, wherein processing the first displayed image based on the one or more adjusted segmentation parameters comprising:

segmenting the first displayed image based on the one or more adjusted segmentation parameters; and in response to segmenting the first displayed image, rendering an updated image of the selected region.

15. The method of claim 1, further comprising:

detecting an unselect signal generated by the input device;

stopping to adjust the one or more segmentation parameters; and stopping to process the first displayed image.

16. The method of claim 1, wherein the move signal is based at least on the movement of one or more screen input controls by the representation of the input device.

17. The method of claim 16, wherein the one or more screen input controls are comprised of at least one knob, slider, dial, button, lever, or wheel.

18. The method of claim 1, wherein the select signal is generated in response to a button press of the input device, and the adjusting is performed in response to movement of the input device while the button press is maintained.

19. A non-transitory computer readable medium having instructions stored thereon, the instructions, when executed by one or more processors of a computer system, cause the computer system to:

obtain one or more segmentation parameters based on a selection of a region of a first displayed image, the selection of the region based on a position of a cursor overlaying the first displayed image and a select signal generated by an input device;

determine a seed point from the position of the cursor overlaying the first displayed image and the select signal, wherein the seed point provides an initial position within the first displayed image for processing;

in response to obtaining the one or more segmentation parameters, process the first displayed image based on the one or more segmentation parameters and the seed point;

adjust the one or more segmentation parameters based on one or more move signals generated by the input device while the select signal is maintained, wherein the cursor overlaying the first displayed image moves in relation to the move signal;

process the first displayed image based on the one or more adjusted segmentation parameters to generate a second displayed image, the second displayed image a segmentation of the first displayed image; and overlay the second displayed image over the selected region, wherein the second displayed image is at least partially transparent such that the first displayed image is visible through the second displayed image.

20. The non-transitory computer readable medium of claim 19, wherein the instructions, when executed by one or more processors of the computer system, further cause the computer system to receive the select signal corresponding to a seed point of the selection of the region within the first displayed image, wherein the selection is based on the cursor overlaying the first displayed image and the select signal generated by the input device.

21. The non-transitory computer readable medium having instructions stored thereon of claim 19, wherein the select signal is generated in response to a button press of the input device, and the adjusting is performed in response to movement of the input device while the button press is maintained.

22. A system for image segmentation, comprising:
one or more processors; and
memory having instructions stored thereon, the instructions, when executed by the one or more processors, cause the computer system to:
obtain one or more segmentation parameters based on a selection of a region of a first displayed image, the selection of the region based on a position of a cursor overlaying the first displayed image and a select signal generated by an input device;
determine a seed point from the position of the cursor overlaying the first displayed image and the select signal, wherein the seed point provides an initial position within the first displayed image for processing;
in response to obtaining the one or more segmentation parameters, process the first displayed image based on the one or more segmentation parameters and the seed point;
adjust the one or more segmentation parameters based on one or more move signals generated by the input device while the select signal is maintained, wherein the cursor overlaying the first displayed image moves in relation to the move signal;
process the first displayed image based on the one or more adjusted segmentation parameters to generate a second displayed image, the second displayed image a segmentation of the first displayed image; and
overlay the second displayed image over the selected region, wherein the second displayed image is at least partially transparent such that the first displayed image is visible through the second displayed image.

23. The system of claim 22, wherein the instructions, when executed by the one or more processors, further cause the computer system to receive the select signal corresponding to a seed point of the selection of the region within the first displayed image, wherein the selection is based on the cursor overlaying the first displayed image and the select signal generated by the input device.

24. The system of claim 22, wherein the select signal is generated in response to a button press of the input device, and the adjusting is performed in response to movement of the input device while the button press is maintained.

* * * * *